OUTBOARD MOTOR TILTING MECHANISM

Original Filed July 14, 1958 5 Sheets-Sheet 1

INVENTOR.
DONALD METTETAL JR.
BY
Andrew F. Wintercorn
ATTORNEY

OUTBOARD MOTOR TILTING MECHANISM

Original Filed July 14, 1958 5 Sheets-Sheet 2

INVENTOR
DONALD METTETAL JR.
BY
Andrew F. Wintercorn
ATTORNEY

OUTBOARD MOTOR TILTING MECHANISM

Original Filed July 14, 1958 5 Sheets-Sheet 3

INVENTOR.
DONALD METTETAL JR.
BY
Andrew F. Wintercorn
ATTORNEY

OUTBOARD MOTOR TILTING MECHANISM

Original Filed July 14, 1958 5 Sheets-Sheet 4

INVENTOR.
DONALD METTETAL JR.
BY
Andrew F. Wintercorn
ATTORNEY

OUTBOARD MOTOR TILTING MECHANISM

Original Filed July 14, 1958 5 Sheets-Sheet 5

INVENTOR.
DONALD METTETAL JR.
BY
Andrew F. Wintercorn
ATTORNEY

United States Patent Office

Re. 27,932
Reissued Feb. 26, 1974

27,932

OUTBOARD MOTOR TILTING MECHANISM

Donald R. Mettetal, Jr., Livonia, Mich., assignor to Andrew F. Wintercorn, trustee, Rockford, Ill.

Original No. 3,406,652, dated Oct. 22, 1968, Ser. No. 748,363, July 14, 1958. Application for reissue Oct. 1, 1969, Ser. No. 33,539
(Filed under Rule 47(b) and 35 U.S.C. 118)
Int. Cl. B63h 5/12
U.S. Cl. 115—41 HT 31 Claims

Matter enclosed in heavy brackets [ ] appears in the original patent but forms no part of this reissue specification; matter printed in italics indicates the additions made by reissue.

*ABSTRACT OF THE DISCLOSURE*

*Hydraulic piston and cylinder means (or power operable screw and nut means) pivotally connected at opposite ends between the transom of the boat and an outboard engine that is pivotally mounted on the transom, usually only for angle adjustment to a fixed setting, is tiltably adjustable quickly by power in either direction to a desired angle usually for "trimming" the engine but occasionally for docking or beaching a boat in shallow water or to enable operating safely at less than usual depth through a weed bed.*

This invention relates to power-operated mechanisms for tilting outboard motors, there being a real need for such mechanisms when:

(1) Docking or beaching a boat in shallow water, where slow and laborious rowing would otherwise be necessary, unless the user is willing to run the risk of damaging the propeller or doing even costlier damage to the engine;

(2) Operating a boat through a weed bed, where operation at the normal depth might foul the propeller and place severe overload strains on the engine;

(3) Peak performance requires "trimming" the engine by tilting it exactly to the most efficient angle of operation relative to the transom, as when weight is so distributed in the boat that the existing angle makes for poor speed and improper ride and is wasteful of power;

(4) Operating a boat with any of the larger and heavier high-powered outboard motors that are too difficult to handle manually, and (5) Transporting a boat with the outboard motor on it, the tilting mechanism serves to raise the engine to an extreme position and hold it there where there is no danger of its striking anything in transit.

I am aware that many existing outboard motors and many more that will be sold without such equipment require tilting mechanisms, and it is, therefore, the principal object of my invention to provide tilting mechanisms designed for application substantially universally to these existing units, regardless of make or model, each tilting mechanism including a bracket to be attached to the engine, another bracket to be mounted on the outside of the transom of the boat, and power operable push-up and pull-down means to be pivotally connected at one end to the engine bracket and pivotally connected at the other end to the transom bracket.

The motor tilting mechanisms of my invention are preferably hydraulically operated, although a mechanical screw and nut form is also contemplated and herein disclosed. Said mechanisms are also preferably remotely controllable, so that the engine tilting can be accomplished without leaving the steering wheel or having to make an awkward reach from that position. Also, said mechanisms preferably include a shear pin for automatically disconnecting the push-up pull-down means from the transom bracket in the event of the rudder portion of the engine striking a heavy object or obstruction in the water, allowing virtually the same freedom of upward swinging movement of the engine under such circumstances as all existing outboard motors, in order to avoid serious damage to the engine or the boat, or both. Also, as a further safety feature, a mercury switch is provided that is tilted with the engine and is connected in the ignition circuit, so as to stop the engine automatically in the event the tilting is carried far enough so that the propeller is raised out of the water, thus preventing harmful running of the engine without load and without water coolant.

The invention is illustrated in the accompanying drawings, in which—

Figure 5:
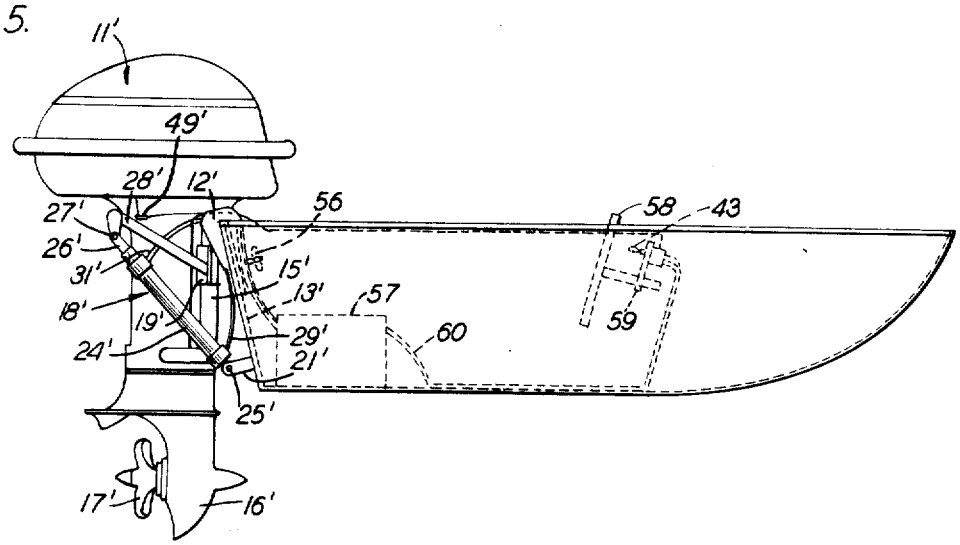
FIGS. 5 and 6 are views similar to FIGS. 1 and 2 showing a simpler and more economical construction.
Figure 7:
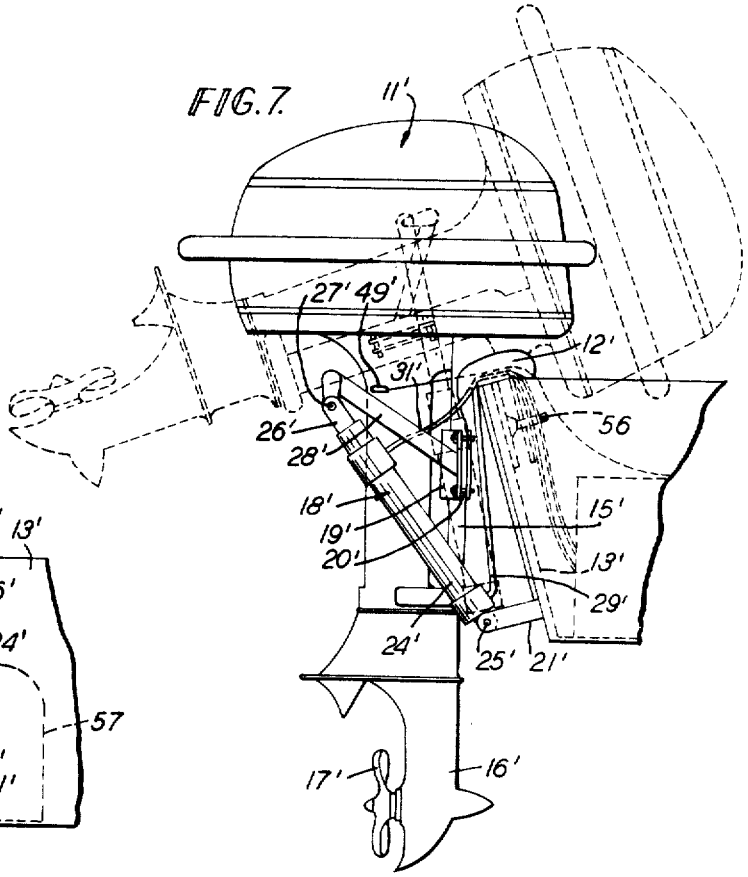
FIG. 7 is an enlargement of a portion of FIG. 5.
Figure 6:
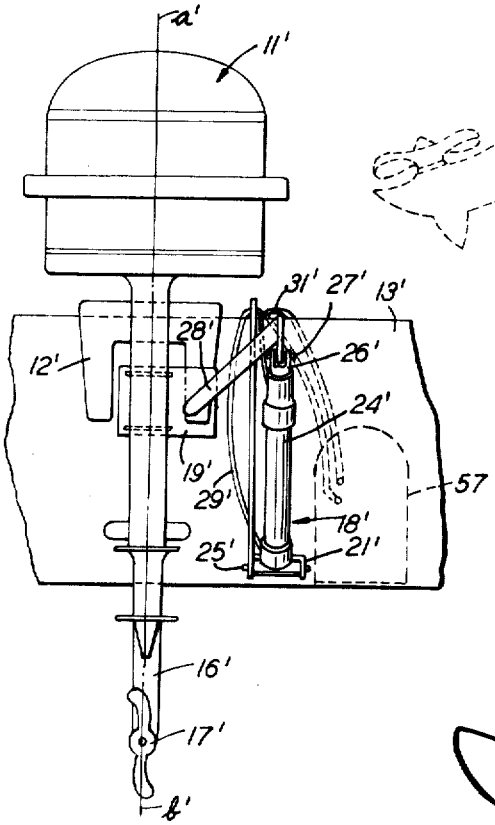
Figure 8:
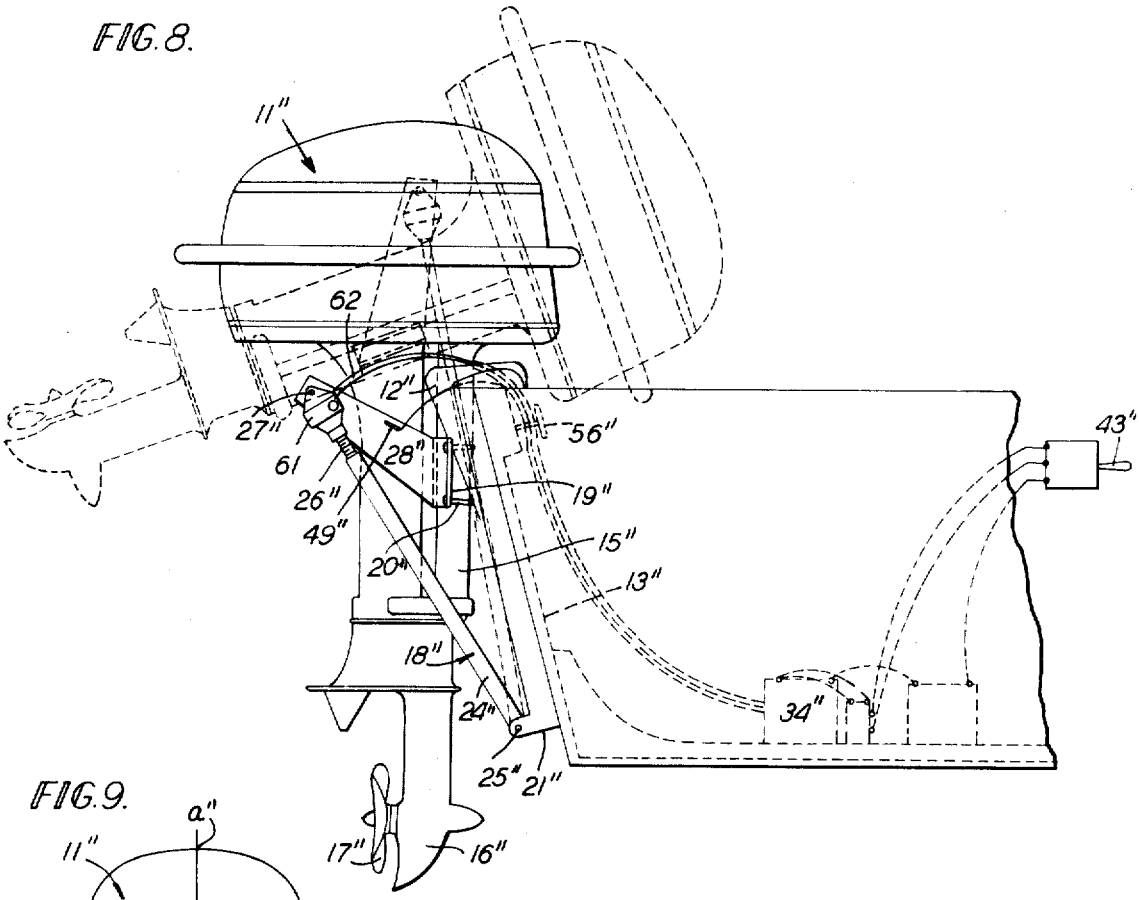
Figure 9:
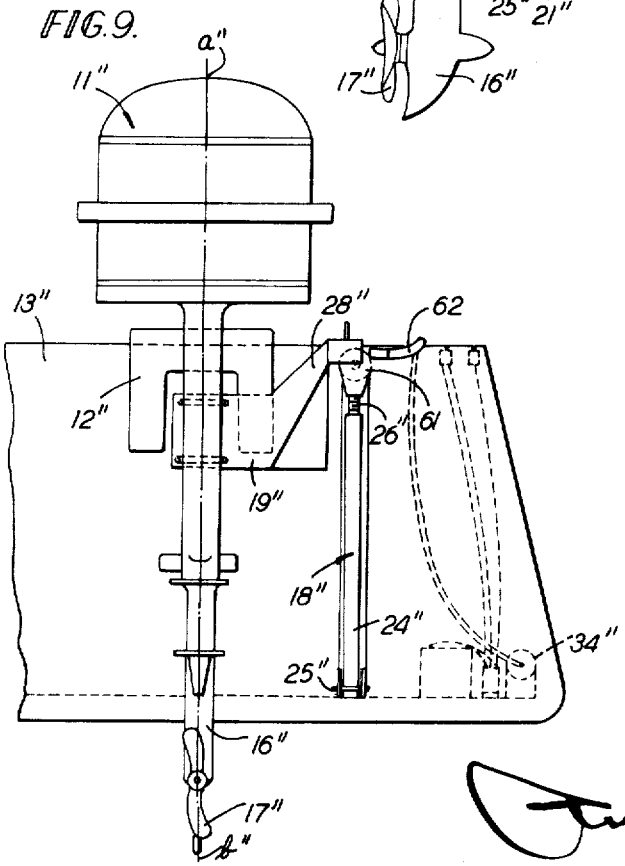
Figure 10:
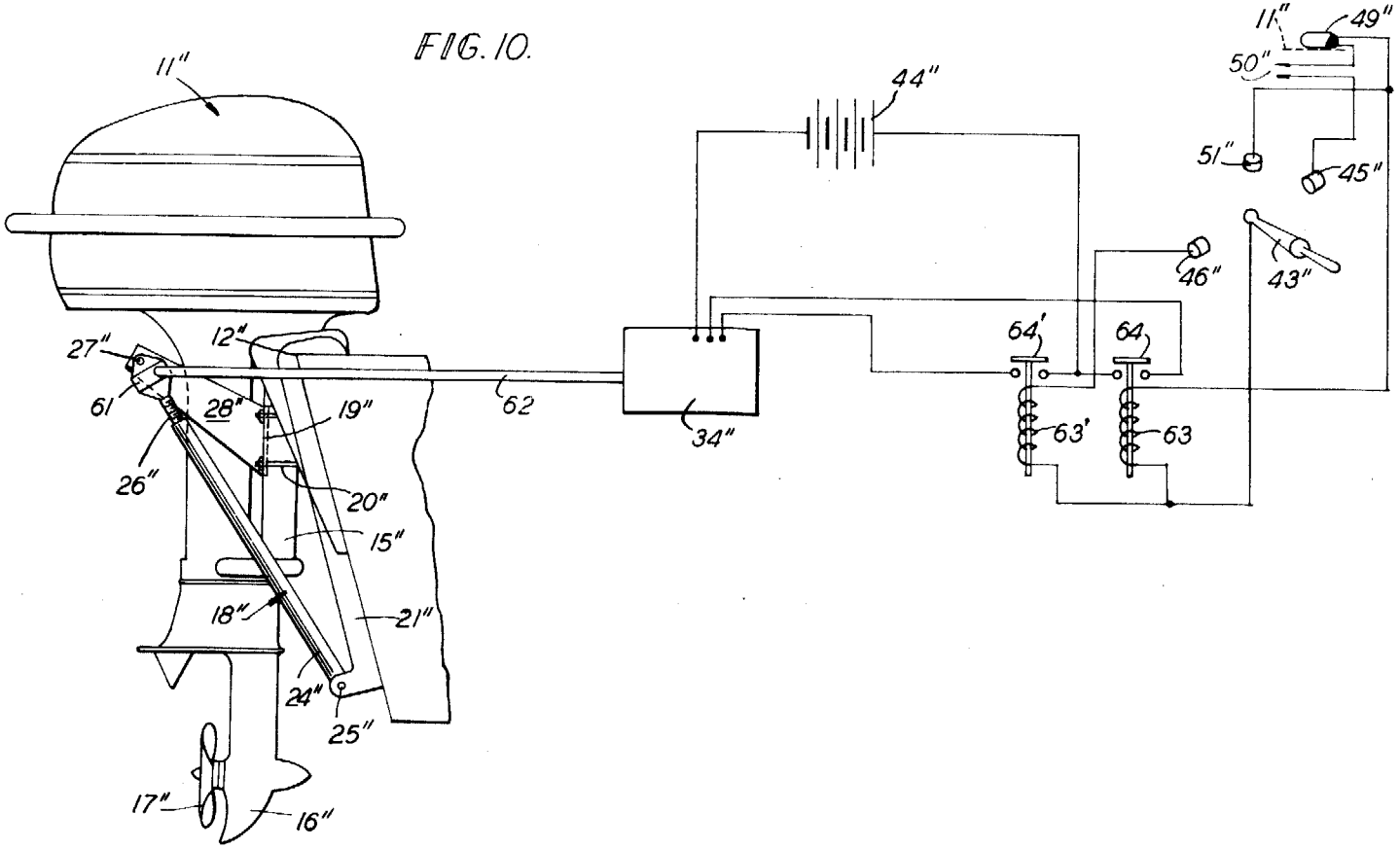

FIGS. 8 and 9 are views similar to FIGS. 5 and 6 showing a mechanical screw and nut type of tilting mechanism in lieu of the hydraulic type shown in FIGS. 5 and 6, and FIG. 10 is an electrical circuit diagram for the tilting mechanism of FIGS. 8 and 9.

Similar reference numerals are applied to corresponding parts throughout the views.

Figure 1:
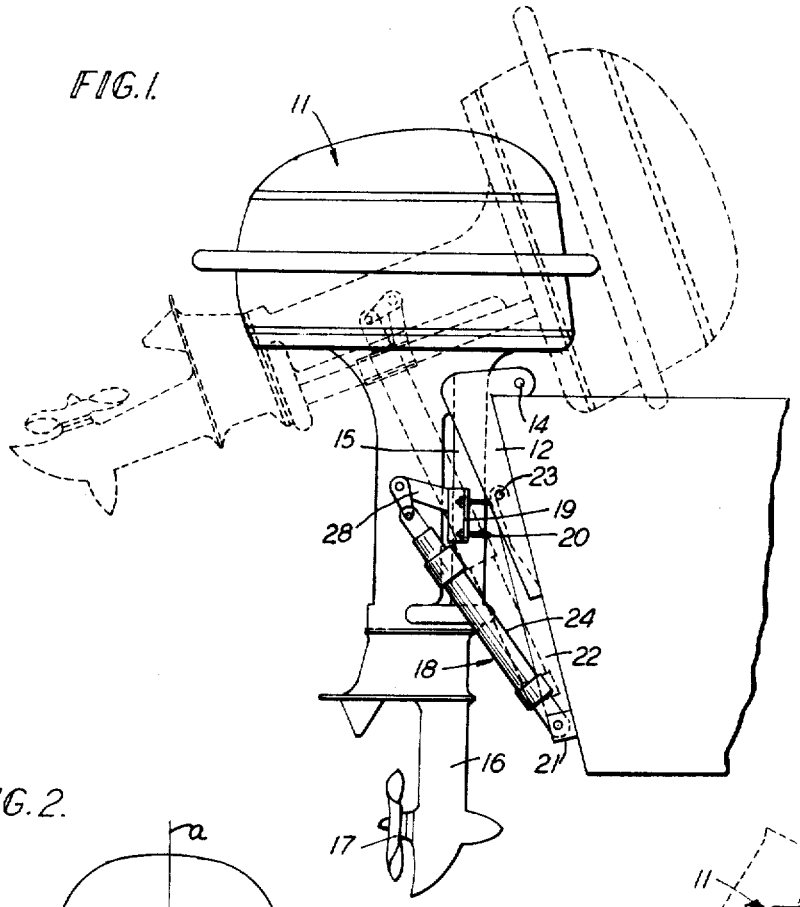
FIGS. 1 and 2 are a side view and rear view, respectively, of an outboard motor equipped with a tilting mechanism made in accordance with my invention.
Figure 2:
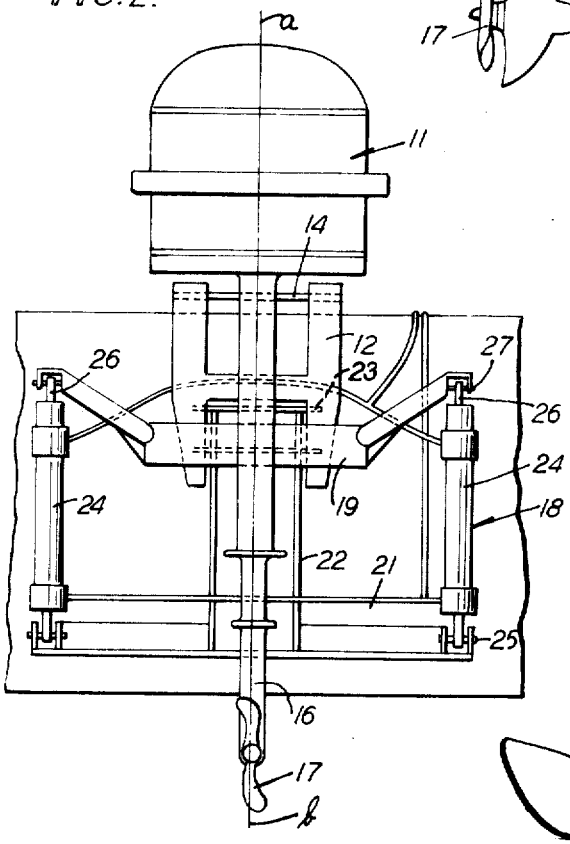
Figure 3:
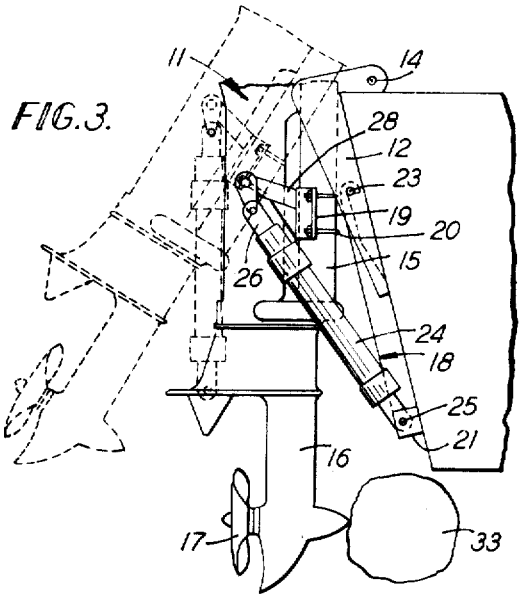
FIG. 3 is a fragmentary side view illustrating in dotted lines the automatic disconnection of the push-up pull-down means from the transom bracket by shearing of a pin in the event the rudder strikes a heavy enough obstruction.

Referring first to FIGS. 1 to 4, the outboard motor, indicated generally by the reference numeral 11, is of a conventional type including a supporting bracket 12 with the usual clamping means for application thereof to the transom 13 on the rear end of the boat, and on this bracket is provided the horizontal pivot pin 14 with respect to which the engine is tiltable, as indicated in dotted lines in FIGS. 1 and 3. The vertical standard 15 of the engine is pivoted at 14, and in the conventional outboard motor there is usually an adjustable stop provided on the supporting bracket 12, to limit the forward swing of the engine, and the operator can set this stop to suit the requirements of the particular boat on which the motor is mounted, according to the angle of the transom with respect to a vertical, and, of course, the engine is swingable about a vertical axis on this standard 15 by means of the tiller (not shown) to steer the boat by angling the rudder 16 and directing the thrust of the propeller 17 accordingly with respect to the sterm of the boat. The tilting mechanism of my invention, indicated generally by the reference numeral 18, involves only the addition of a bracket 19 rigidly secured to the standard 15 by U-bolts 20, another bracket 21 mounted on the transom of the boat either by fastening directly to the transom or by connection with the engine supporting bracket 12, as indicated by the upward extension 22 on the middle of the bracket 21, the upper end of which is pinned, or otherwise suitably secured, to the lower end of the bracket 12, as indicated at 23, and a pair of hydraulic cylinders 24 pivotally connected at their lower ends by shear pins 25 to the opposite ends of the transom bracket 21 and having pistons 26 reciprocable therein, the upper ends of which are pivotally connected, as at 27, to the outer ends of outwardly and rearwardly reaching arms 28 provided on the opposite ends of the engine-attached bracket 19. Obviously, when oil or other liquid is delivered under pressure to the lower ends of the cylinders 24 through a tube 29 and interconnecting tube 30 (FIG. 4) and oil or other liquid is at the same time discharged from the upper end of the cylinders through a tube 31 and interconnecting tube 32, the engine is pushed upwardly, and when the direction of flow of the oil or other liquid is reversed, being supplied through tube 31 and discharged through tube 29, the engine is pulled down again. Of course, the engine will be held in any adjusted position when the flow of oil or other liquid is stopped. In that way it is possible to "trim" the engine to a nicety, securing by infinite adjustment one way or the other the precise angle of the engine with respect to the transom that will make the boat "plane," regardless of any given weight distribution, which might otherwise throw the engine considerably off angle, resulting in poor speed and improper ride and wasted power. The rigid tie-up of the engine with the transom resulting from the application of the tilting mechanism is never disadvantageous, not even in the event of the rudder striking a submerged log, as indicated at 33 in FIG. 3, or any other obstruction, because if that occurs when the boat is traveling at a moderately high speed the pins 25 will shear, as indicated by the dotted line disconnected position of the cylinder 24 in FIG. 3, allowing the engine to swing upwardly to clear a log or other obstruction in the same way as with a conventional outboard motor.

Figure 4:
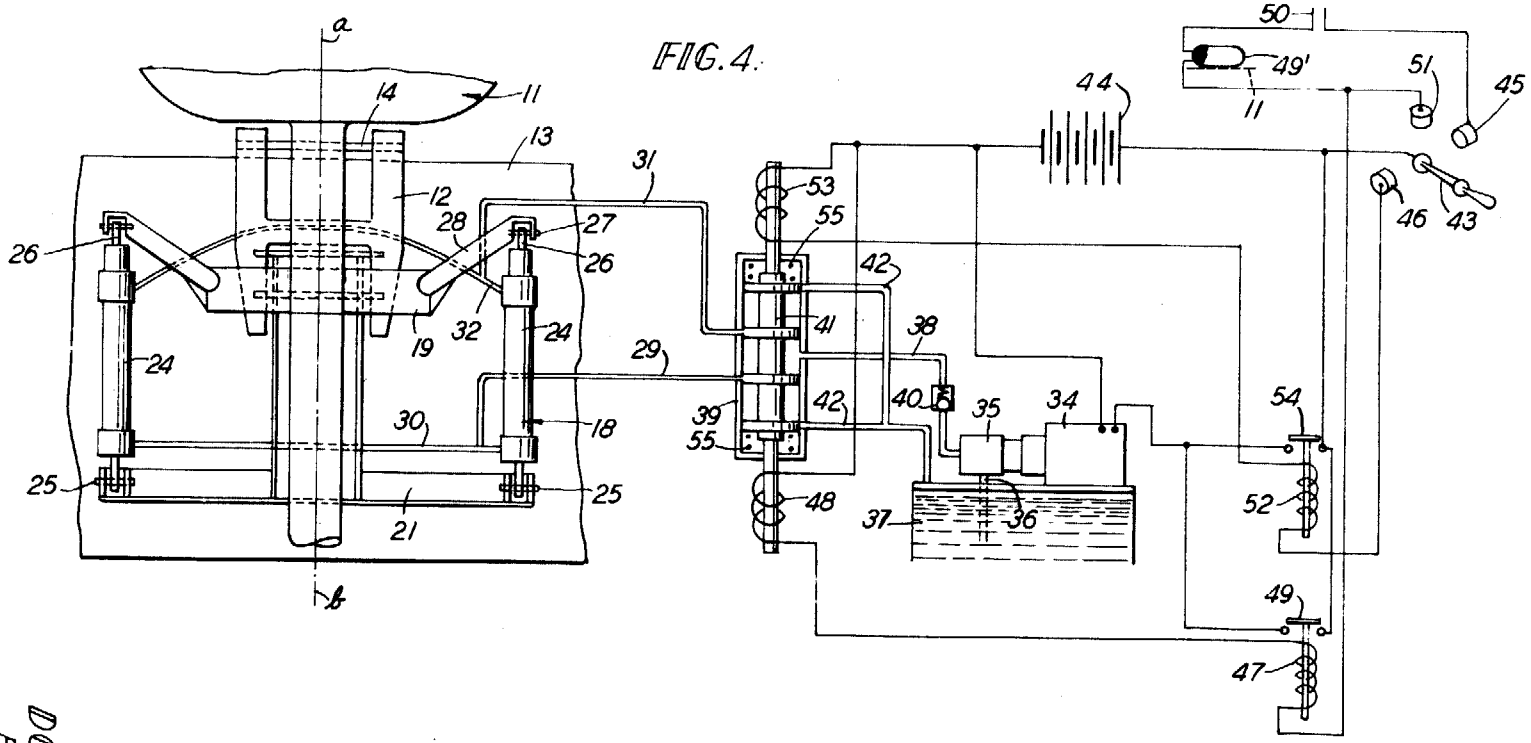
FIG. 4 is a combination hydraulic and electrical circuit diagram for the tilting mecanism shown in FIGS.1 to 3.

In FIG. 4 I have shown an electric motor 34, the armature shaft of which is drivingly connected with a pump 35 having a suction pipe 36 extending into the sump 37 and having a discharge pipe 38 connected to the two-way valve 39, the pipe 38 including a check valve 40, which seats automatically toward the pump to prevent back flow when the pump 35 stops. The tubes 29 and 31 previously mentioned are connected with the valve 39 in the manner shown and the direction of flow of the oil or other liquid through these tubes depends upon the position of the plunger 31. When this plunger is in one extreme position, the fluid is discharged through tube 29 and returned through tube 31, and vice versa in the other extreme position. The fluid returned to the valve 39 is conducted through pipes 42 back to the sump 37. The plunger 41 of the valve 39 is adapted to shifted in response to the movement of a manual control lever 43, which is electrically connected with a battery 44 and may be thrown to the right to engage contact 45 for upward swinging of the engine or to the left to engage contact 46 for downward swinging of the engine. Thus, when the lever 43 engages contact 45 for upward movement, solenoid coils 47 and 48 are energized closing the relay 49 to start the motor 34 and at the same time shifting the valve plunger 41 downwardly for delivery of fluid through tube 29 to the lower ends of the cylinders 24 and discharge of fluid from the upper ends through tube 31. In the event the operator keeps the lever 43 engaged with contact 45 too long, a mercury switch 49', that is included in series in the circuit with the engine ignition, as indicated at 50, and tilts with the engine will automatically break the circuit to stop the engine and thereby eliminate the danger of harm to the engine running without load and without water coolant. On the other hand, if extreme tilting of the engine is desired, as when it is to be transported with the boat and should occupy an extreme horizontal position for safety in transit, the lever 43 may be engaged with an auxiliary contact 51 which shunts out the mercury switch 49'. For downward movement, the lever 43 engages contact 46 and energizes coils 52 and 53, causing upward shifting of the valve plunger 41 simultaneously with closing of the relay 54. Whenever the lever 43 is returned to neutral position, the motor 34 stops and the valve plunger 41 returns to the mid-position under action of whichever one of the return springs 55 has been compressed.

Referring to FIGS. 4 to 7, the outboard motor 11' is similarly mounted on the transom 13' of a boat by means of a supporting bracket 12', and the standard 15' in this case, relative to which the engine is oscillated on a vertical axis in steering the boat, carries a bracket 19' suitably clamped thereon, as indicated at 20', the latter bracket having only one outwardly, rearwardly and upwardly reaching arm 28' provided thereon for pivotal connection at 27' with a single piston 26' in the simpler and more economical tilting mechanism illustrated at 18'. The cylinder 24', in which the piston 26' operates, is pivoted at its lower end, as at 25', on a shear pin mounted on a bracket 21' suitably secured to the transom, as by means of a clamp 56, similar to the usual clamp, on the bracket 12'. The flexible tubes 29' and 31' extending from the opposite ends of the cylinder 24' connect with a valve 39, similarly as in the mechanism of FIGS. 1 to 4, for delivery of oil under pressure to either end of the cylinder 24 and return of oil from the other end to the sump, the unit indicated at 57 containing the motor 34, pump 35, sump 37, and valve 39, as well as the relays 49 and 54 previously decribed, so that all that is needed to enable remote control from the driver's seat behind the steering wheel 58, where the control lever 43 is suitably mounted on the instrument board 59, are the wires 60 extending from the contacts 45, 46, and 51 to the solenoids 47 and 52, and 48 and 53. The operation of this tilting mechanism 18' is, therefore, substantially the same as tilting mechanism 18, but, of course, it goes without saying that with the symmetrical arrangement of the cylinders 24 with respect to the verical center-line a–b of the engine, indicated in FIGS. 2 and 4, and with the equalized pressure active on the two pistons as a result of the interconnection of the cylinders shown at 30 and 32, the push-up and pull-down operation is much smoother than is possible where only a single piston and cylinder type push and pull operating means is employed. In actual practice the mechanism 18' is, for this reason, installed as closely as possible to the vertical center-line a'–b' of the engine, the bracket 19' applied to the standard 15' being laterally adjustable with respect to said standard with that thought in mind, allowing only sufficient operating clearance with respect to the arm 28' for the full range of oscillation of the engine for steering purposes.

The outboard motor 11'' shown in FIGS. 8 to 10 is similarly mounted on the transom 13'' of a boat by means of a supporting bracket 12'', and the standard 15'' in this case, relative to which the engine is oscillated on a vertical axis in starting the boat, carries a bracket 19'' suitably clamped thereon, as indicated at 20'', the latter bracket having only one outwardly, rearwardly and upwardly reaching arm 28'' provided thereon for pivotal connection at 27'' with a housing 61 from which extends screw 26'' threading in internal threads in a tube 24'', the interthreaded parts 24'' and 26'' being substituted in this tilting mechanism 18'' for the cylinder and piston of the hydraulic mechanisms 18 and 18''. The housing 61 contains an intermeshing worm and gear for drivingly connecting a flexible drive shaft in the flexible conduit 62 with the upper end of the screw 26'', the drive shaft with its conduit extending from the housing 61 over the transom of the boat to and being drivingly connected with the reversible electric drive motor 34'' carried in the boat. In this case the control lever 43'' for remote control of the engine tilt is electrically connected along with its contacts 45'', 46'', and 51'' with the battery 44'' and the solenoid coils 63 and 63' of the relays 64 and 64', so that when the lever 43'' is moved into engagement with contact 45'', the screw 26 is turned in one direction for push-up tilting of the engine, and when the lever 43'' is moved in the other direction to engage contact 46'', the motor 34'' operates in the opposite direction to drive the screw 26'' accordingly in the reverse direction for pull-down swinging movement of the engine. The shear pin 25'' pivotally connecting the lower end of the tube 24'' to the transom bracket 21'' is, of course, adapted to shear in the event the rudder 16'' strikes an obstruction, thereby permitting the engine to swing upwardly to clear the obstruction without damage to the engine or boat, or both. Here again, when the engine is tilted upwardly, a mercury switch 49'' included in the engine ignition circuit, as indicated at 50'', serves to stop the engine automatically when the propeller is removed from the water, so that the engine is not apt to be harmed by high speed operation without load and without water coolant, it being, however, possible to obtain full tilt by engaging lever 43'' with contact 51'', as when the engine is to be transported in a horizontal position with the boat for safety in transit. The operation of this form is closely similar to that shown in FIGS. 5 to 7, and, here again, it should be obvious that the closer the unit 18'' can be located with respect to the vertical center-line a''–b'' of the engine, the better, and for that reason the bracket 19'' is purposely made adjustable laterally with respect to the standard 15'' to permit as close positioning of the arm 28'' with respect to the lower portion of the engine as possible, without interfering with the full range of oscillation of the engine for steering purposes.

It is believed the foregoing description conveys a good understanding of the objects and advantages of my invention. The appended claims have been drawn to cover all legitimate modifications and adaptations.

I claim:

1. A power tiltable outboard engine for boats, comprising a supporting bracket detachably attachable to the transom of a boat, a vertical standard pivoted at its upper end of said bracket on a horizontal axis, a housing disposed vertically adjacent said standard and oscillatable on a vertical axis with respect thereto carrying an engine on its upper end and a propeller driven by said engine on its lower end, an upper bracket detachably secured to said standard and having a rearwardly extending arm rigid therewith, a lower bracket fixed with respect to the boat and detachably secured to and extending downwardly from said supporting bracket, telescoping elongated push-pull members, one of which is pivoted at one end to said lower bracket and the other of which is pivoted at its other end to said arm on said upper bracket, and manually controlled power operable means connected for one extension and return of said telescoping members relative to one another incident to the tilting adjustment of said engine and propeller housing.

2. A device as set forth in claim 1, wherein one of the pivotal connections for said telescoping members comprises a shear pin, the shearing of which incident to an overload allows the engine and propeller housing to swing freely with the standard on a horizontal axis relative to the supporting bracket.

3. A device as set forth in claim 1, wherein the telescoping push-pull members include a screw element threaded in a nut element, and said power-operable means is connected to turn one of said elements relative to the other selectively in either direction.

4. A device as set forth in claim 1, wherein the telescoping push-pull members include a piston reciprocable in a cylinder under fluid pressure, aud said power-operable means is connected to deliver fluid under pressure selectively to either end of said cylinder.

5. A device as set forth in claim 1, wherein the telescoping push-pull members include a piston reciprocable in a cylinder under liquid pressure, and said power-operable means is connected to deliver liquid under pressure selectively to either end of said cylinder while draining liquid from the other end.

6. A power tiltable outboard engine for boats, comprising a supporting bracket detachably attachable to the transom of a boat, a vertical standard pivoted at its upper end on said bracket on a horizontal axis, a housing disposed vertically adjacent said standard and oscillatable on a vertical axis with respect thereto carrying an engine on its upper end and a propeller driven by said engine on its lower end, an upper bracket detachably secured to said standard having two rearwardly extending arms rigid with the opposite ends thereof, a lower bracket fixed with respect to the transom of the boat and detachably secured to and extending downwardly from said supporting bracket, pairs of telescoping elongated push-pull members extending between said arms and the lower bracket in equally spaced relation on opposite sides of said engine and propeller housing, one of each pair being pivoted at one end to said lower bracket and the other of each pair being pivoted at the other end to the adjacent arm on said upper bracket, and manually controlled power-operable means connected for the extension and return of said telescoping members relative to one another incident to the tilting adjustment of said engine and propeller housing.

7. A device as set forth in claim 6, wherein one of the pivotal connections for each pair of telescoping members comprises a shear pin, the shearing of which incident to an overload allows the engine and propeller housing to swing freely with the standard on a horizontal axis relative to the supporting bracket.

8. A device as set forth in claim 6, wherein each pair of telescoping push-pull members includes a screw element threaded in a nut element, and said power-operable means is connected to turn one of said elements relative to the other selectively in either direction.

9. A device as set forth in claim 6, wherein each pair of telescoping push-pull members includes a piston reciprocable in a cylinder under fluid pressure, and said power-operable means is conencted to deliver fluid under pressure selectively to either end of said cylinders.

10. A device as set forth in claim 6, wherein each pair of telescoping push-pull members includes a piston reciprocable in a cylinder under liquid pressure, and said power-operable means is connected to deliver liquid under pressure selectively to either end of said cylinders while draining liquid from the other end of said cylinders.

11. In combination, an outboard motor comprising a supporting bracket detachably attachable to the transom of a boat, relative to which bracket the motor is pivoted on a horizontal axis to swing rearwardly and upwardly relative to the rear end of the boat and relative to which bracket the motor is also oscillatable about a vertical axis for steering, manually controlled power operable means for tiltably adjusting the motor and holding the same in adjusted position at a selected angle with respect to the transom of the boat, a tilt-responsive switch tiltable with the motor and connected in series with the ignition circuit therefor and also the electric circuit for the power-operable means, whereby the motor is automatically stopped if tilted too far for continued safe operation.

12. A power tiltable outboard engine for boats, comprising a supporting bracket detachably attachable to the transom of a boat, a vertical standard pivoted at its upper end on said bracket on horizontal axis, a housing disposed vertically adjacent said standard and oscillatable on a vertical axis with respect thereto carrying an engine on its upper end and a propeller driven by said engine on its lower end, a second bracket detachably secured to said standard and having a rearwardly extending arm rigid therewith, a third bracket fixed with respect to the transom of the boat and detachable therefrom, telescoping elongated push-pull members, one of which is pivoted at one end to the third bracket and the other of which is pivoted at its other end to said arm on said second bracket, and manually controlled power operable means connected for the extension and return of said telescoping members relative to one another incident to the tilting adjustment of said engine and propeller housing.

13. A device as set forth in claim 12, wherein the engine has an ignition circuit, and the manually controlled power operable means is electrical and has an electric circuit, the device including a tilt-responsive switch tiltable with the engine and propeller housing and standard and connected in series with the engine's ignition circuit and the electric circuit for the manually controlled power-operable means connected with the telescoping push-pull members, whereby the engine is automatically stopped if the engine and propeller housing is tilted too far for continued safe operation of the engine.

14. A device as set forth in claim 13, including means for shunting said tilt-responsive switch to permit further tilting of said engine and propeller housing.

15. A device as set forth in claim 12, wherein one of the pivotal connections for said telescoping members comprises a shear pin, the shearing of which incident to an overload allows the engine and propeller housing to swing freely with the standard on a horizontal axis relative to the supporting bracket.

16. A device as set forth in claim 12, wherein the telescoping push-pull members include a screw element threaded in a nut element, and said power-operable means is connected to turn one of said elements relative to the other selectively in either direction.

17. A device as set forth in claim 12, wherein the telescoping push-pull members include a piston reciprocable in a cylinder under fluid pressure, and said power-operable means is connected to deliver fluid under pressure selectively to either end of said cylinder.

18. A device as set forth in claim 12, wherein the telescoping push-pull members include a piston reciprocable in a cylinder under liquid pressure, and said power-operable means is connected to deliver liquid under pressure selectively to either end of said cylinder while draining liquid from the other end.

19. A power tiltable outboard engine for boats, comprising a supporting bracket detachably attachable to the transom of a boat, a vertical standard pivoted at its upper end on said bracket on a horizontal axis, a housing disposed vertically adjacent said standard and oscillatable on a vertical axis with respect thereto carrying an engine on its upper end and a propeller driven by said engine on its lower end, a second bracket detachably secured to said standard having two rearwardly extending arms rigid with the opposite ends thereof on opposite sides of said standard, a third bracket fixed with respect to the transom of the boat and detachable therefrom, pairs of telescoping elongated push-pull members extending between said arms and the third bracket on opposite sides of said engine and propeller housing, one of each pair being pivoted at one end to said third bracket and the other of each pair being pivoted at the other end to the adjacent arm on the second bracket, and manually controlled power-operable means connected for the extension and return of said telescoping members relative to one another incident to the tilting adjustment of said engine and propeller housing.

20. A device as set forth in claim 19, wherein the engine has an ignition circuit, and the manually controlled power operable means is electrical and has an electric circuit, the device including a tilt-responsive switch tiltable with the engine and propeller housing and standard and connected in series with the engine's ignition circuit and the electric circuit for the manually controlled power-operable means conected with the telescoping push-pull members, whereby the engine is automatically stopped if the engine and propeller housing is tilted too far for continued safe operation of the engine.

21. A device as set forth in claim 20, including means for shunting said tilt-responsive switch to permit further tilting of said engine and propeller housing.

22. A device as set forth in claim 19, wherein one of the pivotal connections for each pair of telescoping members comprises a shear pin, the shearing of which incident to an overload allows the engine and propeller housing to swing freely with the standard on a horizontal axis relative to the supporting bracket.

23. A device as set forth in claim 19, wherein each pair of telescoping push-pull members includes a screw element threaded in a nut element, and said power-operable means is connected to turn one of said elements relative to the other selectively in either direction.

24. A device as set forth in claim 19, wherein each pair of telescoping push-pull members includes a piston reciprocable in a cylinder under fluid pressure, and said power-operable means is connected to deliever fluid under pressure selectively to either end of said cylinders.

25. A device as set forth in claim 19, wherein each pair of telescoping push-pull members includes a piston reciprocable in an cylinder under liquid pressure, and said power-operable means is connected to deliver liquid under pressure selectively to either end of said cylinders while draining liquid from the other end of said cylinders.

26. An engine mounting system for mounting an outboard engine upon a boat, comprising: means for pivotally mounting an outboard engine upon a boat for pivotal movement about a horizontal axis; a hydraulically operated power device comprising a pair of cylinder members, a pair of piston members mounted within said cylinder members, and a pair of piston rod members extending outwardly of respective ones of said cylinder members; means for mounting one pair of said piston rod and cylinder members upon an external portion of said boat for pivotal movement with respect thereto; connecting means for pivotally connecting the other pair of said piston rod and cylinder members to said outboard engine at a point displaced from said horizontal axis, said connecting means comprising a yoke pivotally connected at its opposite ends to said other pair of members and adapted to be attached in encompassing relation to a vertically extending portion of said engine; a hydraulic pump; and conduit means, including a manually-operated control valve with manual operating means accessible to the operator of the boat from the boat-driving seat, for connecting said pump to said cylinder members to apply fluid thereto, under pressure, to move said piston and piston rod members relative to said cylinder members and pivot said engine, about said axis, between a lowered operating position and an elevated storage and repair position and to maintain the relative positions of said piston rod members and said cylinder members and keep the engine in a trimmed operating position when said manually-operated valve is closed.

27. For use in pivoting an outboard engine from a lowered operating position on a transom of a boat about a horizontal axis to an elevated storage and repair position, engine pivoting mechanism comprising a pair of hydraulic units each including an outer cylinder element and an inner piston having a rod element projecting from said cylinder element, brackets for pivotally connecting one pair of said elements to the transom of a boat, a cross-piece including a yoke member adapted to encircle a drive shaft housing of an outboard engine, said cross-piece being pivotally connected at opposite ends to the other pair of said elements, a hydraulic pump connected to each of said hydraulic units to supply pressurized hydraulic fluid thereto to move one pair of said elements relative to the other pair and thereby exert a force through said yoke for pivoting an outboard engine from a lower to an elevated position, and valve means for controlling the flow of hydraulic fluid from said pump to said hydraulic units to regulate the angular disposition of an outboard motor relative to the transom of a boat.

*28. A device as set forth in claim 27 wherein the hydraulic pump and associated control valve means includes electric motor operated pump means controlled by manually operable switch means for the delivery of fluid under pressure to either end of the cylinders and drainage simultaneously from the other end for the instantaneous positive tilting adjustment of the engine in either direction or back and forth to a desired setting.*

*29. A device as set forth in claim 27 including means firmly resisting rearward swinging movement of the engine*

*from a set position while the boat is in motion forwardly under power, said means being yieldable whereby to avoid damage to the engine and/or boat in the event of the lower propeller end of the engine striking an obstruction.*

*30. A device as set forth in claim 29 wherein the yieldable means comprises a shear pin forming a part of the lower one of the pivotal connections for said hydraulic units.*

*31. A power tiltable outboard engine for boats comprising a supporting bracket detachably attachable to the transom of a boat, a vertical standard pivoted at its upper end on said bracket on a horizontal axis, a housing disposed vertically adjacent said standard and oscillatable on a vertical axis with respect thereto carrying an engine on its upper end and a propeller driven by said engine on its lower end, secondary bracket means fixed with respect to the outside of the transom of the boat and detachable therefrom, telescoping elongated push-pull members, one of which is pivoted at one end to the secondary bracket means and the other of which is pivotally connected to said standard, and manually controlled power operable means connected for the extension and return of said telescoping members relative to one another incident to the positive tilting adjustment of said engine and propeller housing, the telescoping push-pull members including a screw element threaded in a nut element, and said power operable means being connected to turn one of said elements relative to the other selectively in either direction.*

References Cited

The following references, cited by the Examiner, are of record in the patented file of this patent or the original patent.

UNITED STATES PATENTS

| | | | |
|---|---|---|---|
| 2,927,552 | 4/1957 | Mickey | 115—41 |
| 2,966,876 | 1/1961 | MacWilliam | 115—41 |
| 1,172,176 | 2/1916 | Stanley | 115—17 |
| 1,302,957 | 5/1919 | Owen | 115—18 |
| 1,801,781 | 4/1931 | Parsons | 115—17 |
| 2,747,536 | 5/1956 | Russell | 115—41 |
| 2,755,766 | 7/1956 | Wanzer | 115—41 X |
| 2,893,342 | 7/1959 | Langford | 115—41 |
| 2,997,014 | 8/1961 | Puckett | 115—17 |
| 3,024,758 | 3/1962 | Lieber | 115—41 |
| 2,740,368 | 4/1956 | Irgens et al. | 115—18 |
| 2,815,731 | 7/1955 | Curtis | 115—41 |
| 2,916,008 | 12/1959 | Bauer | 115—18 |

MILTON BUCHLER, Primary Examiner

C. A. RUTLEDGE, Assistant Examiner

U.S. Cl. X.R.

115—17